US012692949B2

(12) United States Patent
Faye et al.

(10) Patent No.: US 12,692,949 B2
(45) Date of Patent: Jul. 28, 2026

(54) VALVE FOR A ROCKET ENGINE

(71) Applicant: ARIANEGROUP SAS, Les Mureaux (FR)

(72) Inventors: Olivier Faye, Vernon (FR); Sonia Rios Fernandez, Vernon (FR); Philippe Nomerange, Vernon (FR); Nicolas Mazarguil, Vernon (FR)

(73) Assignee: ARIANEGROUP SAS, Les Mureaux (FR)

( * ) Notice: Subject to any disclaimer, the term of this patent is extended or adjusted under 35 U.S.C. 154(b) by 0 days.

(21) Appl. No.: 18/837,246

(22) PCT Filed: Feb. 7, 2023

(86) PCT No.: PCT/FR2023/050160
§ 371 (c)(1),
(2) Date: Aug. 9, 2024

(87) PCT Pub. No.: WO2023/152443
PCT Pub. Date: Aug. 17, 2023

(65) Prior Publication Data
US 2025/0137535 A1     May 1, 2025

(30) Foreign Application Priority Data
Feb. 11, 2022     (FR) ...................................... 2201223

(51) Int. Cl.
*F16K 3/24*          (2006.01)
*F02K 9/58*          (2006.01)
(Continued)

(52) U.S. Cl.
CPC ................ *F16K 3/246* (2013.01); *F02K 9/58* (2013.01); *F16K 1/123* (2013.01); *F16K 3/30* (2013.01);
(Continued)

(58) Field of Classification Search
USPC ...................................... 251/129.11; 137/219
See application file for complete search history.

(56) References Cited

U.S. PATENT DOCUMENTS 2,265,435 A * 12/1941 Kinzie ...................... F16K 1/12
251/355
2,878,827 A * 3/1959 Johnson ............... G05D 7/0635
137/219
(Continued)

FOREIGN PATENT DOCUMENTS

CN          113503364 A     10/2021
EP          0362053 A1      4/1990
(Continued)

OTHER PUBLICATIONS

Serach Report and Written Opinion issued in International Application No. PCT/FR2023/050160, mailed Aug. 17, 2023.
Office Action issued in corresponding application No. EP 23706827.5, issued Jun. 2, 2025.

*Primary Examiner* — Matthew W Jellett
(74) *Attorney, Agent, or Firm* — Bookoff McAndrews, PLLC

(57)          ABSTRACT
A valve suitable for high flow rates and high pressures, and a rocket engine including such a valve, the valve including a valve body, including a first fluidway and a second fluidway, a movable shutter, configured to adjust the flow area between the first fluidway and the second fluidway, and an actuator, of electrical type, configured to adjust the position of the shutter, wherein the shutter is able to move linearly between a first position and a second position, wherein the actuator includes a rotor installed in a service cavity of the valve body, the service cavity being in fluid communication with the first fluidway or the second fluidway, and wherein the actuator is configured to drive the movement of the shutter by way of a rotary-to-linear transmission member.

14 Claims, 5 Drawing Sheets

(51) Int. Cl.

| | |
|---|---|
| *F16K 1/12* | (2006.01) |
| *F16K 3/30* | (2006.01) |
| *F16K 31/04* | (2006.01) |
| *F16K 31/50* | (2006.01) |
| *F16K 31/528* | (2006.01) |
| *F16K 3/312* | (2006.01) |
| *F16K 3/314* | (2006.01) |
| *F16K 3/316* | (2006.01) |

(52) U.S. Cl.

CPC ............ *F16K 31/04* (2013.01); *F16K 31/046* (2013.01); *F16K 31/048* (2013.01); *F16K 31/50* (2013.01); *F16K 31/528* (2013.01); *F16K 31/5286* (2013.01); *F16K 3/312* (2013.01); *F16K 3/314* (2013.01); *F16K 3/316* (2013.01)

(56) References Cited

U.S. PATENT DOCUMENTS

| | | | | |
|---|---|---|---|---|
| 4,452,423 A | * | 6/1984 | Beblavi | .................... F16K 1/02 251/88 |
| 4,789,132 A | * | 12/1988 | Fujita | ..................... F16K 31/04 137/219 |
| 6,220,272 B1 | * | 4/2001 | Tavor | ....................... F16K 1/12 137/219 |
| 2012/0012766 A1 | | 1/2012 | Gauss et al. | |

FOREIGN PATENT DOCUMENTS

| | | |
|---|---|---|
| EP | 0937928 A1 | 8/1999 |
| EP | 3721123 B1 | 9/2021 |
| RU | 183710 U1 | 10/2018 |

* cited by examiner

[Fig. 5]
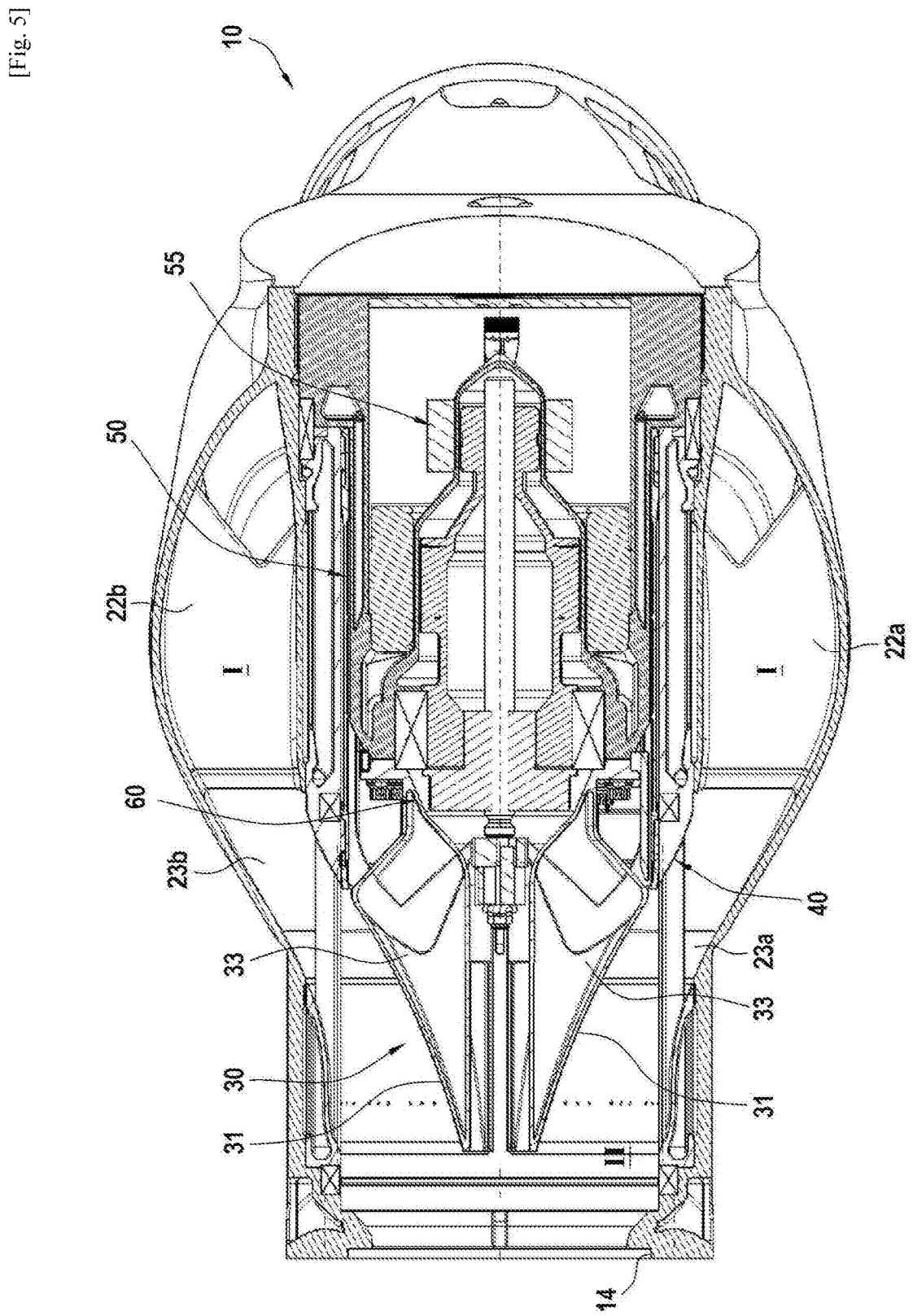

VALVE FOR A ROCKET ENGINE

CROSS-REFERENCE TO RELATED APPLICATIONS

This is a National Stage Application under 35 U.S.C. § 371 of International Application No. PCT/FR2023/050160, filed Feb. 7, 2023, now published as WO 2023/152443 A1, which claims priority to French Patent Application No. 2201223, filed on Feb. 11, 2022.

TECHNICAL FIELD

This summary relates to a valve suitable for high flow rates and high pressures. Such a valve is particularly suitable for rocket engines, particularly for controlling the flow rate of cryogenic propellant at the inlet of the combustion chamber. However, such a valve is also perfectly suitable for less demanding applications, in the aeronautical or naval sectors for example.

PRIOR ART

A cryogenic-propellant rocket engine works by providing the combustion of two propellants, usually liquid hydrogen LH2 and liquid oxygen LOX, inside a combustion chamber. A conventional example of a rocket engine, deliberately simplified, is shown on FIG. 1.

Such a rocket engine 1 thus comprises a combustion chamber 2, surmounting a nozzle 3, a circuit for supplying a first propellant 4, a circuit for supplying a second propellant 5 and a drive circuit 6. The circuit for supplying a first propellant 4 comprises a first tank 4a, containing the liquid fuel, here liquid hydrogen LH2, a first shut-off valve 4g, a first turbopump 4b and a first supply valve, generally known as the chamber valve 4c. This chamber valve 4c controls the flow rate of the first propellant arriving at the combustion chamber 2 via a cooling circuit 4d of the nozzle 3. Similarly, the circuit for supplying a second propellant 5 comprises a second tank 5a, containing the liquid fuel, here liquid oxygen LOX, a second shut-off valve 5g, a second turbopump 5b and a second chamber valve 5c; this chamber valve 5c controls the flow rate of the second propellant arriving at the combustion chamber 2. Each propellant supply circuit 4, 5 also comprises a bleed duct 4e, 5e the flow rate of which is controlled by a bleed valve 4f, 5f and which arrives in the combustion chamber of a gas generator 6a of the drive circuit 6. The gases resulting from the combustion of the propellants in the gas generator 6a then drive a turbine 6b before rejoining the combustion chamber 2 of the rocket engine, the rotation of the turbine 6b driving the turbopumps 4b and 5b as a single part.

In such a rocket engine, the chamber valves are particularly critical members since they are in charge of adjusting, as precisely and responsively as possible, the flow rate of propellant arriving at the main combustion chamber: the correct control of the operating point of the rocket engine in the different phases of its mission thus depends on the proper operation, precision and responsiveness of the chamber valves. They must also be capable of completely interrupting the flow rate of propellant, for example in order to be able to very quickly shut down the rocket engine in the event of an emergency.

Since they are exposed to very high pressures, in the order of 200 bar, and also very high flow rates, in the order of 300 kg/s, these chamber valves must be capable of resisting very high mechanical stresses. Similarly, very high power is needed to be able to actuate the valve.

Consequently, the chamber valves known at the present time, usually of ball or flap type, are very bulky and very heavy: these chamber valves are therefore expensive to produce and have a negative impact on the payload that the rocket can carry. For example, the chamber valves of the Vulcan engine, of pneumatic ball valve type, have a mass greater than 30 kg. These chamber valves are moreover based on actuating technologies (pneumatic, hydraulic) with a high power density: this makes it possible to limit the mass and bulk of these equipment items to a certain extent, but these technologies also have operational limitations (operating temperature, difficulties or even impossibility of control) which limit the functions that these valves can fulfil and have an impact on the performance of the engine.

The very high pressures experienced by these valves also pose considerable sealing problems, at the shutter of course but also at the interface between the shutter and its actuator located outside the valve body. The very low temperature of the propellants traversing these valves, less than 100 K, adds an additional limitation by prohibiting many commonly-used materials. The use of special seals is therefore imperative, which gives rise to additional limitations in terms of cost, reliability, wear and power consumed due to rubbing. These limitations are all the more critical since these valves, and therefore these seals, are constantly in use according to the control requirements of engine. In particular, these seals wear out quickly, which limits the possibility of reusing the engine, unless expensive maintenance is performed between each launch.

Moreover, due to the very high power required to actuate this type of valve, it is at present very difficult to use electrical actuators, although these are easier to control, unless the total mass of the valve is drastically increased or the actuation force is limited, which becomes problematic when reacting quickly enough in emergencies.

There is therefore a real need for a valve and an engine that are free, at least in part, of the drawbacks inherent to the aforementioned known configurations.

SUMMARY OF THE INVENTION

This summary relates to a valve, comprising a valve body, including a first fluidway and a second fluidway, a movable shutter, configured to adjust the flow area between the first fluidway and the second fluidway, and an actuator, of electrical type, configured to adjust the position of the shutter, wherein the shutter is able to move linearly between a first position, in which it is completely inserted between the first fluidway and the second fluidway, bringing the flow area between the first fluidway and the second fluidway to zero, and a second position, in which the flow area between the first fluidway and the second fluidway is brought to a maximum value, wherein the actuator comprises a rotor installed in a service cavity of the valve body, said service cavity being in fluid communication with the first fluidway or the second fluidway, and wherein the actuator is configured to drive the movement of the shutter by way of a rotary-to-linear transmission member.

Owing to such a submerged rotor, the valve body can be completely sealed: specifically, no seal is needed at the interface between the shutter and the actuator since both of them are located inside the valve body. The control and driving of the actuator rotor can meanwhile be done from outside, since the magnetic flux generated by the stator of the electrical actuator is able to traverse the wall of the service cavity. This configuration therefore makes it possible to dispense with dynamic seals, which are complex and expensive and subject to wear, to ensure the sealing of the valve body, apart, of course, from the connection of its first and second fluidways.

In addition, owing to such a linearly slidable shutter, it is only necessary to ensure the sealing of the shutter inside the valve body when this latter is located in its first position, i.e. its closing position. It is therefore possible to make provision for seals which are stressed only in this first position, which greatly reduces their wear and thus makes it possible to envision the use of the valve for the control of a reusable launcher stage engine, without extensive maintenance of the valve between each launch. In addition, since the sealing devices are not subjected to any rotational movement, they can be of a more simple design than in the case of a rotary ball valve for example: in particular, it is possible to dispense with any elastic device for loading the seal of these sealing devices.

Moreover, importantly, since these joints are only stressed in the first position, they do not rub and thus do not oppose the movement of the shutter during its normal work of regulation, which significantly reduces the power needed to handle it. The dimensions of the actuator can therefore be reduced, which reduces its bulk, mass and cost. It even becomes possible to use an electrical actuator, more precise than a pneumatic actuator for example.

The use of a slidable shutter and a rotary-to-linear transmission member also makes it possible to work with an angular actuator track that is very long, optionally over several turns. It is therefore possible to control the position of the shutter much more accurately than is feasible with a conventional rotary shutter, the useful track of which rarely exceeds 50°.

Owing to these different gains, it is possible to obtain a compact and significantly lighter valve than in the prior art. Thus, for example, for a valve capable of allowing the passage of a flow rate greater than 250 L/s, the length of such a valve can be less than 50 cm, or even less than 40 cm, for a mass far less than 30 kg.

In certain embodiments, the second fluidway extends along a main axis of the valve and the first fluidway forms a non-zero angle with said main axis. The first fluidway is thus not situated in the extension of the first fluidway, which leaves enough space to fashion the service cavity.

In certain embodiments, this angle is an acute angle, preferably between 10 and 80°, still preferably between 3° and 60°. This angle is measured as being the separation from the situation in which the first fluidway is situated in the extension of the second fluidway. An angle moving away from the right angle makes it possible to reduce the load loss at the interface between the first and second fluidways.

In certain embodiments, the first fluidway comprises a connection orifice and is divided into two channels, each channel circumventing the main axis on a different side of the valve before opening into the second fluidway. Such a configuration makes it possible to limit the load loss of the valve while facilitating the incorporation of the service cavity. The two channels are preferably symmetrical. They can meet before encountering the shutter or else the shutter can be inserted in front of each of the channels.

In certain embodiments, the two channels of the first fluidway divide at the level of a separation ridge facing the connection orifice of the first fluidway. This ridge is preferably positioned in the axial plane; it forms the most acute angle possible, for example an angle of less than 20°, preferably less than 10°, still preferably less than 5°. This minimizes the impact of this separation on the flow rate of the first fluidway.

In certain embodiments, the diameter of the connection orifice of the first fluidway and/or the diameter of the connection orifice of the second fluidway is greater than 10 mm, preferably greater than 50 mm. In addition, the diameter of the connection orifice of the first fluidway and/or the diameter of the connection orifice of the second fluidway is preferably less than 300 mm, preferably less than 200 mm.

In certain embodiments, the diameter of the connection orifice of the first fluidway is equal to the diameter of the connection orifice of the second fluidway.

In certain embodiments, the service cavity is in fluid communication with the second fluidway.

In certain embodiments, the first fluidway is the inlet fluidway of the valve and the second fluidway is the outlet fluidway of the valve. However, the reverse configuration can be envisioned, the valve being in particular able to be reversible.

In certain embodiments, the shutter takes the form of a cylindrical sleeve, preferably with a circular base. The shutter thus gradually closes the passage between the first fluidway and the second fluidway in a way that is substantially parallel to the interface surface between the first fluidway and the second fluidway. Consequently, the angle formed between the direction of the movement of the shutter and the local direction of the flow is small, less than 45°, preferably less than 30°; in other words, the shutter laminates the flow when it moves, so without putting up any significant resistance. In particular, no surface of the shutter is oriented substantially perpendicularly to one of the two fluidways. Hence, the maneuvering of the shutter is particularly easy and requires only a small amount of power. In particular, this configuration ensures a good balance of the pressures on either side of the shutter. Specifically, owing to such a shutter of lamination type, the load loss of the valve is not directly absorbed by the actuator: one thus manages to uncouple the load loss and the actuating power required. The power required for the actuator is thus significantly reduced.

In certain embodiments, the peripheral wall of the shutter is solid. The regulation of the flow is therefore done by the progress of the end edge of the shutter.

In certain embodiments, the peripheral wall of the shutter comprises at least one cut-out. Such a cut-out makes it possible to obtain a control equation for the flow rate, which is not simply proportional to the distance travelled by the shutter. In particular, the width of this cut-out can be variable.

In certain embodiments, the valve comprises at least one slidable bearing configured to guide the movement of the shutter. This bearing is used to guide the shutter while minimizing friction forces during the movement. The valve can in particular comprise two bearings, mounted for example at the two ends of the shutter. The bearings can for example be mounted in notches formed in the outer surface of the shutter.

In certain embodiments, the valve comprises at least one first seal mounted in the second fluidway, ahead of the point of confluence between the first fluidway and the second fluidway. This seal makes it possible to ensure the tightness of the shutter, and therefore the complete closure of the valve when the shutter is in its first position.

In certain embodiments, the valve comprises a second seal mounted in the second fluidway, behind the point of confluence between the first fluidway and the second fluidway. This seal makes it possible to ensure the tightness of the shutter behind the first fluidway, when the fluid can reach this back area, particularly when the shutter comprises an inner passage.

In certain embodiments, the first seal is compressed against the shutter solely when the shutter is located in its first position. The wear of the seal is therefore reduced. In addition, since the first seal is not rubbing against the shutter outside of the first position, the friction forces exerted on the shutter are reduced, which facilitates its maneuvering.

In certain embodiments, the second seal is compressed against the shutter solely when the shutter is located in its first position. The wear of the seal is therefore reduced. In addition, since the second seal is not rubbing against the shutter outside of the first position, the friction forces exerted on the shutter are reduced, which facilitates its maneuvering.

In certain embodiments, the shutter comprises at least one shoulder configured to interact with at least one seal. Such a shoulder makes it possible to only compress the seal when the shutter is in a particular position, typically the first position, i.e. when the seal is facing the shoulder. In particular, such a shoulder can be provided for each seal. Each shoulder can in particular be preceded by a slope to gradually compress the seal and reduce the risk of damaging it.

In certain embodiments, the first and/or the second seal is a stop seal. In particular, apart from the moment when the shutter reaches its first position and therefore compresses the seals, these seals do not need to accommodate a relative movement between the seal and the shutter. It is thus possible to dispense with dynamic seals, which makes it possible to reduce the number of parts subject to wear, and the cost and complexity of the valve. In particular, dynamic seals have a short lifetime in cryogenic applications.

In certain embodiments, each seal is a lip seal comprising a metallic expander. Such a configuration is especially suitable when the valve is traversed by a low-temperature fluid, for example a cryogenic propellant.

In certain embodiments, the valve comprises an anti-rotation member mounted securely in the valve body and configured to lock the rotation of the shutter. This anti-rotation member can in particular interact directly with the shutter in order to lock its rotation. This anti-rotation member makes it possible to confine the shutter to moving exclusively axially. This can in particular simplify the operation of the rotary-to-linear transmission member.

In certain embodiments, the anti-rotation member comprises radial slots in which radial tabs of the shutter are engaged.

In certain embodiments, the valve comprises a deflective surface mounted in the second fluidway, at the point of confluence between the first fluidway and the second fluidway, the deflective surface being profiled in such a way as to extend the first fluidway into the second fluidway. This deflective surface makes it possible to ensure a certain continuity between the first fluidway and the second fluidway despite the angle formed between these latters, which makes it possible to reduce the load loss at the interface between the two fluidways.

In certain embodiments, the deflective surface is borne by the anti-rotation member.

In certain embodiments, the actuator is an electric motor, preferably synchronous, still preferably with permanent magnets. However, the electric motor could be of another type, for example asynchronous, for example with a rotor of squirrel cage type.

In certain embodiments, the rotor of the actuator comprises permanent magnets. The rotor, submerged, does not therefore comprise any electric member.

In certain embodiments, the stator of the actuator is installed in a control chamber surrounding the service cavity, said control chamber being tightly separated from the service cavity by a separating wall. The electric members of the actuator are therefore kept in an area away from the fluid or fluids traversing the valve. In particular, no physical passage of any kind, and therefore no seal, is provided between the service cavity and the control chamber.

In certain embodiments, the thickness of the separating wall is less than 10 mm, preferably less than 5 mm, still preferably less than 2 mm. Specifically, the more this thickness is reduced, the more the air gap between the stator and the rotor of the actuator can be reduced, and the more efficient the actuator. In addition, the more this thickness is reduced, the more the eddy currents inevitably appearing in the wall are reduced, which preserves the actuator efficiency still further.

In certain embodiments, the control is accessible axially from the rear of the valve body. This allows, where applicable, the simplification of the maintenance of the actuator. A hatch can in particular close the back end of the control chamber.

In certain embodiments, the stator of the actuator is installed in the service cavity. The stator of the actuator is therefore also submerged: this variant is especially suitable when the fluid through the valve is not electrically conductive and does not pose any risk of self-ignition. This removes the limitation of having to make provision for a separating wall between the rotor and the stator. The efficiency of the actuator can also be improved.

In certain embodiments, the valve comprises a bearing for which provision is made between the rotor of the actuator and the peripheral wall of the service cavity. The bearing is therefore submerged. This can in particular be a ball bearing.

In certain embodiments, the valve comprises a resolver, the rotor of the resolver being installed in the service cavity secured to the rotor of the actuator. The rotor of the resolver is therefore also submerged. This resolver makes it possible to know the angular position of the rotor and therefore to deduce the position of the shutter therefrom. Such a resolver can thus contribute to the control of the actuator, and in particular contribute to the control of the electrical phases of the actuator.

In certain embodiments, the stator of the resolver is installed in the control chamber. However, it could also be installed in the service cavity in scenarios where the stator of the actuator is itself also located in the service cavity.

In certain embodiments, the separating wall comprises at least a first cylindrical portion possessing a first diameter and at least a second cylindrical portion possessing a second diameter, different from the first diameter. This makes it possible to adapt to the respective diameters of the actuator rotor and of the resolver rotor.

In certain embodiments, the valve comprises a control module configured to control the actuator as a function of a setpoint.

In certain embodiments, the transmission member comprises a screw-nut assembly. Such a configuration is particularly practical and inexpensive to implement.

In certain embodiments, the screw-nut assembly comprises a planetary roller screw. Such a configuration makes it possible to obtain a very fine pitch, practically without play, which ensures a very precise control of the position of the shutter. However, in other, less demanding embodiments, the screw-nut assembly could comprise a ball bearing screw or else a conventional screw and nut.

In certain embodiments, the nut is secured to the rotor of the actuator and the screw is secured to the shutter.

In certain embodiments, the pitch of the screw is between 0.5 and 1.5 mm.

In certain embodiments, the track of the shutter between the first position and the second position is greater than 10 mm, preferably greater than 50 mm. It is preferably less than 300 mm.

In certain embodiments, the actuator is configured to move the shutter from the second position to the first position in less than 1000 ms.

In certain embodiments, the actuator is configured to bring the shutter into any intermediate position between the first position and the second position.

In certain embodiments, at least the valve body is manufactured by additive manufacturing. This is preferably also the case of the shutter and/or the anti-rotation member. The use of an additive manufacturing technique makes it possible to obtain, easily and relatively inexpensively, a complex geometry and therefore a geometry particularly optimized for the valve body: this is particularly useful for obtaining the separating wall delimiting the service cavity. The use of an additive manufacturing technique is especially beneficial here due to the low surface ratio that has to be reworked using conventional machining for reasons of surface condition or significant required precision.

In certain embodiments, the valve is configured to be traversed by a liquid, a gas or a two-phase fluid. In the most demanding applications, the pressure of this fluid can in particular be greater than 200 bar and its flow rate greater than 250 L/s. Similarly, in the most demanding applications, the temperature of the fluid can be between 15 and 120 K. However, this valve is also perfectly suitable for less demanding applications, for example applications in which the pressure of this fluid is less than 15 bar and/or in which the temperature of this fluid is near ambient temperature, for example between 270 and 350 K. According to the desired application, particularly when the fluid is at ambient temperature, certain members, and in particular the seals or the transmission member, can be simplified to meet the requirements of the desired application at a lower cost.

In certain embodiments, the valve is configured to be traversed by a propellant, preferably cryogenic. It can in particular be liquid hydrogen $LH_2$, liquid oxygen LOX or liquid methane $LCH_4$.

In certain embodiments, the valve is configured to be traversed by gaseous hydrogen, gaseous methane or else kerosene. For example, such a valve could be used on board an airplane using hydrogen as the fuel. Such a valve could also be used on board a ship for its propulsion.

This summary also relates to an engine, comprising at least one valve as claimed in any of the preceding embodiments.

In certain embodiments, this engine is an engine of a space vehicle, for example of a launcher or orbital vehicle. It is preferably a rocket engine.

In certain embodiments, this engine is an engine of an aeronautical vehicle. It can in particular be a hydrogen engine.

In certain embodiments, this engine is a marine engine.

The aforementioned features and advantages, along with others, will become apparent from reading the following detailed description, of exemplary embodiments of the valve and of the engine proposed. This detailed description refers to the appended drawings.

BRIEF DESCRIPTION OF THE DRAWINGS

The appended drawings are schematic and above all aim to illustrate the principles of the summary.

On these drawings, from one figure to the next, identical elements (or element parts) are identified by the same reference numbers.

FIG. 5 is a section view along the plane V of FIG. 2, with the valve open.

DESCRIPTION OF THE EMBODIMENTS

To make the summary more practical, an example of a valve will be described in detail below, with reference to the appended drawings. It is recalled that the invention is not limited to this example.

Figure 1:
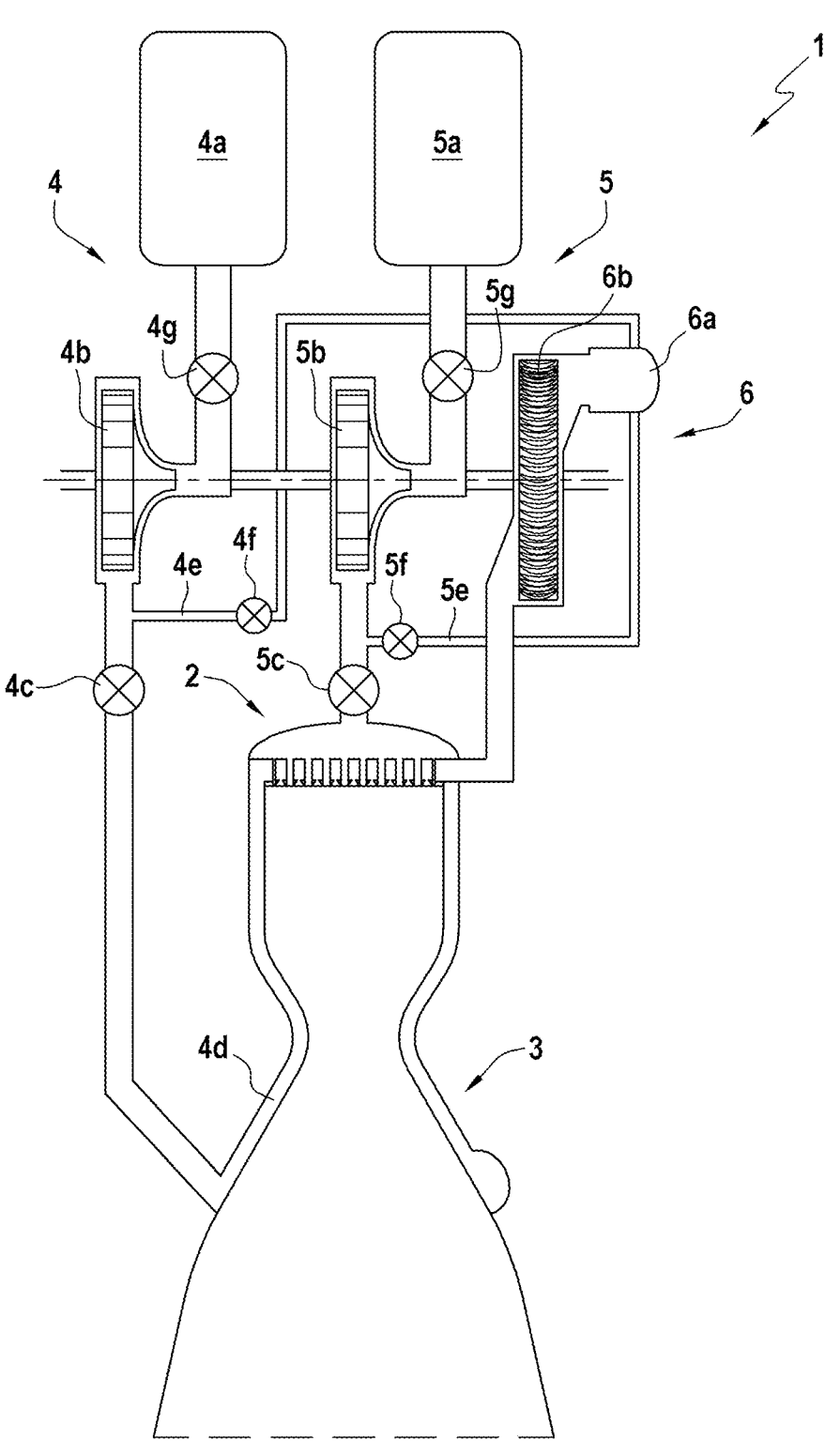
FIG. 1 is a block diagram of a rocket engine.
Figure 2:
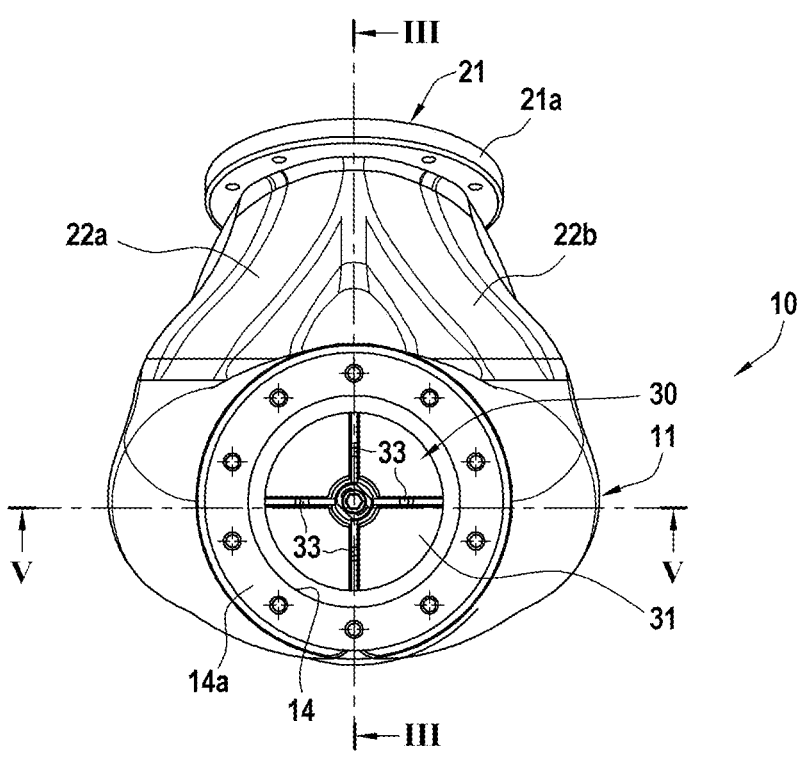
FIG. 2 is a front view of an example of a valve.

FIG. 1 schematically represents a rocket engine. As has been shown in the introductory part of this summary, each circuit for supplying propellant 4, 5 comprises a chamber valve 4c, 5c regulating the flow rate of propellant reaching the combustion chamber 2.

FIGS. 2 to 5 now illustrate an example of a valve 10 according to the invention, which can be an appropriate form of such chamber valves 4c, 5c. The valve 10 is thus configured, in this example, to be traversed by a cryogenic propellant, for example LH2 or LOX, at a pressure in the order of 200 bar, a temperature in the order of 20 to 110 K and a flow rate in the order of 250 L/sec. However, this valve could also be suitable for forming the bleed valves 4f, 5f or the shut-off valves 4g, 5g, as long as their dimensions are modified.

The valve 10 comprises a valve body 11 including a main part 12, cylindrical and extending along a main axis A, and a volute 20 for which provision is made around the back portion of the main part 12. The valve body 11 is manufactured as a single part using an additive manufacturing method.

The front portion of the main part 12 comprises an axial passage 13 opening onto the front end of the valve body 11 at the level of a connection orifice 14 surrounded by a connection flange 14a. This axial passage 13 thus forms the second fluidway II of the valve 10.

The back portion of the main part 12, meanwhile, comprises, at its center, a service cavity 15 open at its front end in such a way as to communicate fluidly with the second fluidway II of the valve 10. The periphery and the back end of the service cavity 15, meanwhile, are closed by a first separating wall 16.

The back portion of the main part 12 also comprises, coaxially to the service cavity 15, a maneuvering cavity 17, annular and open at its front end in such a way as to also fluidly communicate with the second fluidway II. It is delimited on its radially inward side by a second separating wall 18.

The back portion of the main part 12 also comprises, concentrically between the service cavity 15 and the maneuvering cavity 17, a control chamber 19. This control chamber 19 is tightly isolated from the second fluidway II of the valve owing to the first and second separating walls 16, 18. It is also closed at its back end by a removable hatch 19a making it possible, where applicable, to access the control chamber 19 from the outside of the valve 10.

The volute 20, meanwhile, forms the first fluidway I of the valve 10. The volute 20 also comprises a connection orifice 21, also surrounded by a connection flange 21a. This connection orifice 21a has as central direction an axis B forming an angle θ of approximately 60° with the main axis A. In this example, the diameter of the second connection orifice 21 is equal to 90 mm.

The volute 20 then comprises two channels 22a, 22b splitting after a separating edge 23 extending in an axial plane facing the connection orifice 21. Each channel 22a, 22b then circumvents the main part 12 of the valve body 11 on either side, symmetrically, until they each open into the axial passage 13 of the main part 12 through an opening 23a, 23b.

In this example, the first fluidway I constitutes the inlet fluidway, i.e. the upstream fluidway, of the valve 10, while the second fluidway II constitutes the outlet, i.e. the downstream fluidway; however, the circulation within the valve 10 could very well be reversed.

The valve 10 further comprises an anti-rotation member 30 provided in the axial passage 13 of the second fluidway II. More precisely, this anti-rotation member 30, manufactured by additive manufacturing, is mounted rigidly on a structural ring 16a marking the join between the first and second separating walls 16 and 18. The anti-rotation member 30 comprises a peripheral revolution surface forming a deflective surface 31 advancing in the second fluidway II in the extension of the channels 22a, 22b of the first fluidway I. The anti-rotation member 30 also comprises a central passage 32, extending axially, and a plurality of guide slots 33, here four in number, extending in radial planes between the central passage 32 and the deflective surface 31.

Figure 3:
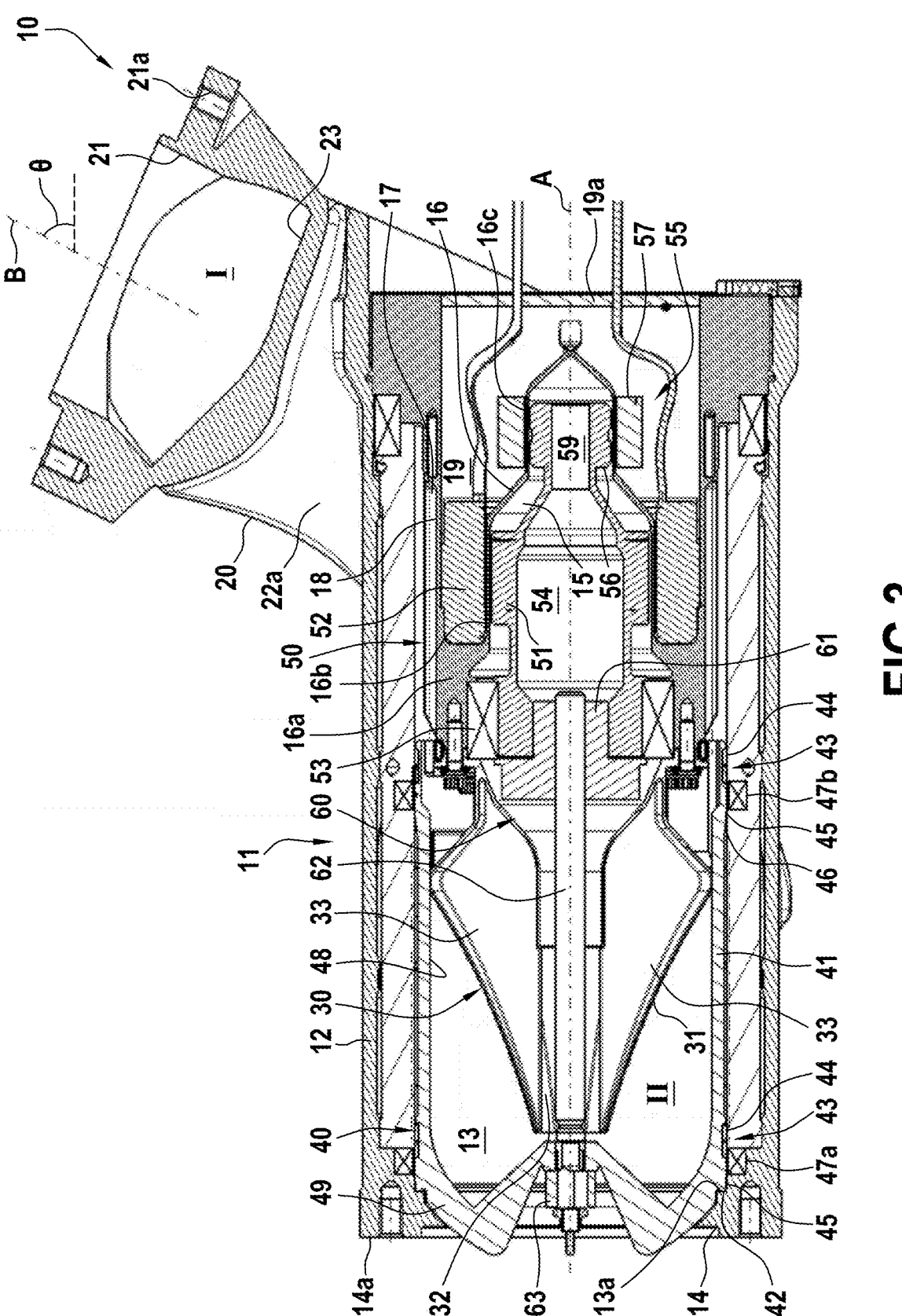
FIG. 3 is a section view along the plane Ill of FIG. 2, with the valve closed.
Figure 4:
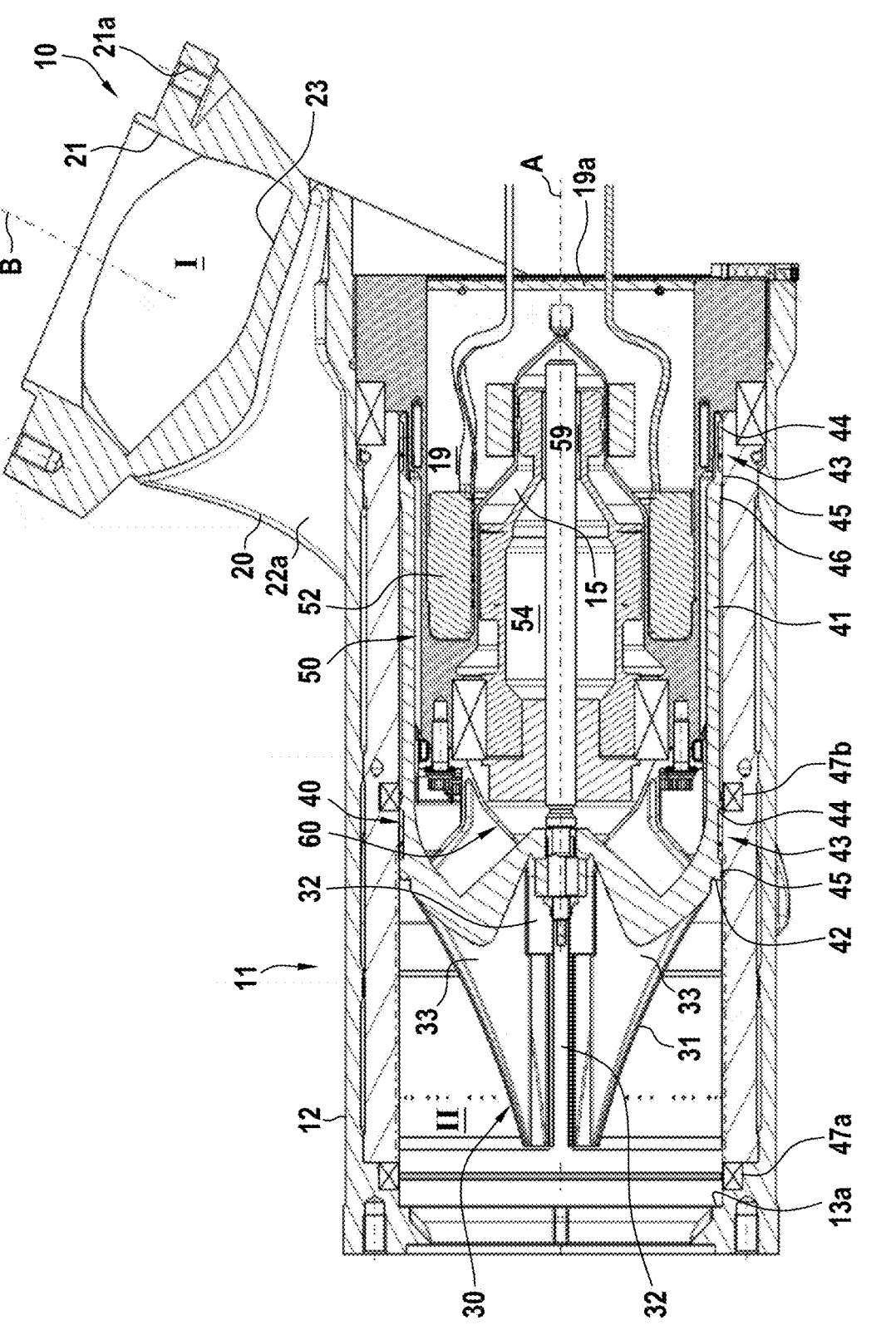
FIG. 4 is a section view along the plane III of FIG. 2, with the valve open.

The valve 10 further comprises a shutter 40 in the form of a cylindrical sleeve capable of linearly moving between a first end position, shown on FIG. 3, and a second end position, shown on FIG. 4. The shutter 40 is also manufactured by additive manufacturing.

In the first end position, the peripheral wall 41 of the shutter 40, the so-called shutting wall, extends along the entirety of the peripheral surface of the axial passage 13 of the valve body 11, thus inserted between the first fluidway I and the second fluidway II. In this position, a stop surface 42 provided in front of the shutter 40 is located at the stop against a shoulder 13a of the axial passage 13 while the back end of the shutting wall 41 is engaged in the maneuvering cavity 17.

In the second end position, the shutting wall 41 of the shutter 40 is entirely retracted into the maneuvering cavity 17, its back end then being located in abutment against the bottom of the maneuvering cavity 17. In this position, the shutting wall 41 does not project at all over the openings 23a, 23b of the channels 22a, 22b of the first fluidway.

The outer surface of the shutting wall 41 comprises, near each of its axial ends, a notch 43 in which provision is made for a slide bearing 44 in order to guide the translational motion of the shutter 40 and reduce the friction forces exerted during this motion. In particular, this slide bearing 44 can be of the deformable segment type, for example made of PTFE or a derivative material with a low frictional coefficient.

The outer surface of the shutting wall 41 also comprises, near each of its axial ends, a shoulder 45 radially protruding over the whole of the shutting wall 41. These shoulders 45 are here provided just in front of each notch 43. The back shoulder 45 is also preceded here by a rail 46.

The valve body 11 meanwhile comprises a first seal 47a, annular, mounted in front of the point of confluence between the first fluidway I and the second fluidway II, here at the front end of the passage 13, and a second seal 47b, annular, mounted behind the point of confluence between the first fluidway I and the second fluidway II, here at the back end of the passage 13, just in front of the maneuvering cavity 17. The axial distance separating the seals 47a, 47b is equal to the axial distance separating the shoulders 45.

Owing to such a configuration, the seals 47a, 47b are compressed against the shoulders 45 when the shutter 40 is in its first end position, which ensures the sealing of the shutter 40 when the valve 10 is closed. On the other hand, in the second end position, as well as in any intermediate position, the seals 47a and 47b are not compressed, the first seal 47a no longer being situated facing the shutter 40 and the second seal 47b facing a thinner portion of the shutting wall 41.

In this example, the seals 47a, 47b comprise a lip extending radially from a body possessing an annular cavity into which a metallic expander is inserted. Each seal 47a, 47b also comprises a dovetail retaining piece extending from the body in order to ensure its attachment. In particular, the body of these seals 47a, 47b can be machined out of a polymer that retains a certain elasticity at low temperatures and which is compatible with the fluid being conveyed, for example filled PTFE. Note that the structure of these seals 47a, 47b could be simplified for other, less critical applications.

The shutter 40 also comprises ribs 48 extending axially along the inner surface of the shutting wall 41. The number of these ribs 48 is equal to the number of the guide slots 33 of the anti-rotation member 30, each rib 48 being engaged in one of the guide slots 33. The ribs 48 extend at their front end by radial connecting tabs 49.

The valve 10 further comprises an actuator 50, of the electric motor type, comprising a rotor 51 and a stator 52. The rotor 51 of the actuator 50, having the main axis A as an axis of rotation, is housed in the service cavity 15 and is therefore submerged when the valve is in service. It is more precisely mounted rotatably within the service cavity 15 by way of a roller bearing 53 mounted against the inner surface of the structural ring 16a. A minimum clearance is left between the rotor 51 and the portion 16b of the separating wall 16 that surrounds the rotor 51. In addition, the rotor 51 of the actuator 50 includes a central passage 54, extending along the main axis A.

The stator 52, meanwhile, is housed in the control chamber 19, pressed flat against the portion 16b of the separating wall 16, concentrically with respect to the rotor 51. To minimize the air gap between the rotor 51 and the stator 52, at least the first portion 16b of the first separating wall 16 has a thickness less than 10 mm, preferably less than 5 mm, still preferably less than 2 mm.

In this example, the actuator 50 is a synchronous electric motor with permanent magnets. It is of non-salient pole type with sinusoidal electromotive force and double star connection. The actuator 50 here comprises six pairs of poles. The magnets of the rotor are encapsulated using laser welds and follow an alternating arrangement or else a Halbach arrangement.

The valve 10 also comprises a resolver 55, it too comprising a rotor 56 and a stator 57. The rotor 56 of the resolver 55 is also housed in the service cavity 15 and therefore becomes submerged when the valve 10 is in service. The rotor 56 of the resolver 55 is secured to the rotor 51 of the actuator 50, in the extension of the latter along the main axis A, on its back side: the rotor 56 of the resolver 55 therefore also has the main axis A for its axis of rotation.

Since the rotor 56 of the resolver 55 possesses a smaller diameter than the rotor 51 of the actuator 50, the diameter of the first separating wall 16 decreases from the back end of its first cylindrical portion 16b until it reaches a second cylindrical portion 16c, the diameter of which is just slightly larger than that of the rotor 56 of the resolver 55, plus or minus the play. The diameter of the first separating wall then continues to decrease until it is eliminated, thus enclosing the back end of the service cavity 15. In addition, the rotor 56 of the resolver 55 includes a central passage 59, extending along the main axis A.

The stator 57 of the resolver 55, meanwhile, is housed in the control chamber 19, pressed flat against the portion 16c of the separating wall 16, concentrically with respect to the rotor 56. In this example, the resolver 55 is a two-wire brushless resolver.

The valve 10 also comprises a control module, housed in the control chamber 19, used to drive the actuator as a function of a setpoint transmitted to the valve 10. With regard to this, in this example, the control of the actuator 50 is done in a closed loop by a sine current command via the position feedback supplied by the resolver 55.

The valve 10 further comprises a rotary-to-linear transmission member 60. This transmission member 60 comprises, on the one hand, a roller nut 61 secured to the rotor 51 of the actuator 50. This roller nut 61 is more precisely mounted at the front end of the rotor 51, in a way that is centered on the main axis A. The roller nut 61 therefore rotates around the main axis A as a single part with the rotor 51 of the actuator 50.

The transmission member 60 moreover comprises a screw 62 extending axially, along the main axis A, in engagement with the roller nut 61. The rotation of the roller nut 61 therefore drives the translation of the screw 62 along the main axis A, the screw 62 being capable of progressing forward through the central passage 32 of the anti-rotation member and backward through the central passages 54 and 59 of the rotors 51 and 56 of the actuator 50 and of the resolver 55.

The screw 62 also comprises, at its front end, a connecting piece 63 used to join the radial connecting tabs 49 of the shutter 40 and to rigidly connect them to the screw 62. Thus, when the screw 62 progresses forward or backward, it drives the shutter 40 in translation as a single part.

With regard to this, this motion of the shutter 40 and of the screw 62 is purely axial since the guide slots 32 of the anti-rotation member 30 prevent the shutter 40, and therefore the screw 62, from rotating around the main axis A.

Thus, the actuator 50 is capable of bringing the shutter 40 into any position between its two end positions quickly and precisely. In this example, the actuator 50 is thus capable of maneuvering the shutter 40 from its first end position, completely closed, to its second end position, completely open, in less than one second with an electrical power of less than 2000 W (with a supply voltage between 50 and 400 V).

Although this invention has been described with reference to specific exemplary embodiments, it is obvious that modifications and changes can be made to these examples without departing from the general scope of the invention as defined by the claims. In particular, individual features of the different embodiments illustrated/mentioned may be combined into additional embodiments. Consequently, the description and drawings must be considered in an illustrative sense rather than a restrictive one.

It is also obvious that all the features described with reference to a method are transposable, alone or in combination, to a device, and conversely, all the features described with reference to a device are transposable, alone or in combination, to a method.

The invention claimed is:

1. A valve, comprising a valve body, including a first fluidway and a second fluidway,
   a movable shutter, configured to adjust a flow area between the first fluidway and the second fluidway,
   two seals, a first seal being mounted in the second fluidway, ahead of a point of confluence between the first fluidway and the second fluidway, and a second seal being mounted in the second fluidway, behind the point of confluence between the first fluidway and the second fluidway, and
   an actuator, of electrical type, configured to adjust a position of the movable shutter,
   wherein the movable shutter is able to move linearly between a first position, in which it is completely inserted between the first fluidway and the second fluidway, bringing the flow area between the first fluidway and the second fluidway to zero, and a second position, in which the flow area between the first fluidway and the second fluidway is brought to a maximum value,
   wherein the actuator comprises a rotor installed in a service cavity of the valve body, said service cavity being in fluid communication with the first fluidway or the second fluidway, and
   wherein the actuator is configured to drive movement of the movable shutter by way of a rotary-to-linear transmission member.

2. The valve as claimed in claim 1, wherein the second fluidway extends along a main axis of the valve and the first fluidway forms a non-zero angle with said main axis.

3. The valve as claimed in claim 1, wherein the first fluidway comprises a connection orifice and is divided into two channels, each of the two channels circumventing a main axis on a different side of the valve before opening into the second fluidway.

4. The valve as claimed in claim 1, wherein the movable shutter takes a form of a cylindrical sleeve.

5. The valve as claimed in claim 1, wherein the first seal is compressed against the movable shutter solely when the movable shutter is located in its first position, and
   wherein the second seal is compressed against the movable shutter solely when the movable shutter is located in its first position.

6. The valve as claimed in claim 1, comprising an anti-rotation member mounted securely in the valve body and configured to lock a rotation of the movable shutter.

7. The valve as claimed in claim 1, comprising a deflective surface mounted in the second fluidway, at the point of confluence between the first fluidway and the second fluidway, the deflective surface being profiled in such a way as to extend the first fluidway into the second fluidway.

8. The valve as claimed in claim 1, wherein the actuator is an electric motor.

9. The valve as claimed in claim 1, wherein the actuator is a synchronous electric motor.

10. The valve as claimed in claim 1, wherein the actuator is a synchronous electric motor with permanent magnets.

11. The valve as claimed in claim 1, wherein a stator of the actuator is installed in a control chamber surrounding the service cavity, said control chamber being tight and separated from the service cavity by a separating wall.

12. The valve as claimed in claim 1, wherein the rotary-to-linear transmission member comprises a screw and a nut.

13. The valve as claimed in claim 1, wherein the rotary-to-linear transmission member comprises a screw and a roller nut.

14. An engine, comprising at least one valve as claimed in claim 1.

* * * * *